United States Patent [19]

Lee

[11] Patent Number: 5,711,404

[45] Date of Patent: Jan. 27, 1998

[54] MAGNETIC ADJUSTABLE LOADING DEVICE WITH EDDY CURRENT

[76] Inventor: Ying-Che Lee, No. 1-2, Lane 975, Chun-Jih Rd., Tao-Yuan City, Taiwan

[21] Appl. No.: 794,888

[22] Filed: Feb. 5, 1997

[51] Int. Cl.⁶ .................. F16F 15/03; B60L 7/28
[52] U.S. Cl. .................. 188/164; 188/267; 188/158; 482/903
[58] Field of Search .................. 188/164, 163, 188/161, 158, 159, 160, 267; 310/93, 103, 105; 192/84.5; 482/5, 6, 57, 63, 903, 92; 242/288

[56] References Cited

U.S. PATENT DOCUMENTS

| | | | |
|---|---|---|---|
| 5,072,930 | 12/1991 | Sun | 482/903 |
| 5,096,024 | 3/1992 | Wu | 188/164 |
| 5,234,083 | 8/1993 | Lee | 188/159 |
| 5,236,069 | 8/1993 | Peng | 482/903 |
| 5,254,061 | 10/1993 | Leask | 482/903 |
| 5,437,353 | 8/1995 | Wu | 310/105 |
| 5,586,624 | 12/1996 | Ko et al. | 482/903 |

Primary Examiner—Douglas C. Butler
Attorney, Agent, or Firm—Morton J. Rosenberg; David I. Klein; Jun Y. Lee

[57] ABSTRACT

A magnetic adjustable loading device with eddy current comprises a flywheel and a rotor made from metal conductor. A stator comprises with a magnetic plate and permanent magnet. By changing the air gap between the rotor and stator, the magnetic flux density is changed. Characterized in that the axial displacement of the stator is replaced by a stator which performs the radial displacement. The loading or resistance can be adjusted in a stepless manner. The overall dimension of the loading device can be reduced and it can be applied in a more flexible and subtle way.

4 Claims, 7 Drawing Sheets

MAGNETIC ADJUSTABLE LOADING DEVICE WITH EDDY CURRENT

FIELD OF THE INVENTION

This invention relates to a magnetic adjustable loading device with eddy current wherein this loading device features a compact configuration, stable performance, and excellent durability. The load can be adjusted automatically.

DESCRIPTION OF PRIOR ART

Loading or braking device used on sporting equipment for applying working loads to the user can be categorized into the following types: 1) frictional contact; 2) hydraulic cylinder; 3) fan; and 4) generator. In the frictional contact type, the loading device suffers a disadvantage of easily worn out of lining plate. Besides, the loads can not be precisely adjusted and are also unstable. For the hydraulic cylinder, the cylinder tends to have a leakage after a period of usage. By the way, during the operation, the noisy level is unacceptable and the loading is unstable when the temperature of fluid is getting higher. To the fan type loading device, it suffers a bulky size and poor aesthetic appearance. Besides, the range of loading is quite narrow and is difficult to adjust. For the generator type, the cost is high and configuration is complicated as compared with other conventional types.

Recently, a loading device by applying eddy current is introduced to the market. By changing the magnetic field or dimension of the conductor, the eddy current generated thereof can be accordingly changed. Consequently, the load can be therefore changed and adjusted. Because this is a non-direct contact type loading device, it can be readily connected to a computer. In light of this, it has a great potential capability in the market. The working principle of eddy current is passing a conductor through a variable magnet field. During it, an localized, closed-loop electric potential, i.e. eddy current, is generated. When an eddy current is generated, an accompanied magnetic field is also generated wherein the direction of the accompanied magnetic field is contradictory to the original and variable magnetic field. From the Maxwell's Equation, the amount of the accompanied magnetic force is proportional to the square of the density of the magnetic field and this accompanied magnetic force can be used as the loads or brakes of the sporting equipment.

Among the available magnetic adjustable loading devices with eddy current, each of them has both advantages and disadvantages. For the most popular non-coaxial type, the stator comprising magnetic iron plate and permanent magnet and the conductor comprising a rotating flywheel are not installed at a common shaft. Accordingly, it is very inconvenient in assembling those element into a compact assembly. On the other hand, the air gap between two adjacent the rotor and stator are different from one to another, i.e. unstable, accordingly, each of the loading device has its own rotating torque. Since the rotating torque can not be accurately controlled, it can only apply on the sporting device with lower accuracy requirements. Nevertheless, the sporting equipment requires an exact and precise control to get a substantial result, but this above mentioned device can not meet this requirements.

There is another eddy current loading device which has a better design wherein the stator comprising magnetic iron plate, permanent magnet and supporting bracket is movable along a shaft. The resistance resulted therefrom is dependent on the mating area between the stator and conductor disposed at the inner rim of the flywheel. When the stator is completely moved into the flywheel, the largest resistance is generated. While when the stator is pulled out of the flywheel, the resistance generated therefrom is accordingly reduced. In light of this, the working load or resistance can be controlled. Nevertheless, this type of loading device suffers from a disadvantage that during the flywheel is rotated, a resistance parallel to the shaft will be generated, accordingly, a greater work is needed to move the stator toward or away from the flywheel, especially when the flywheel is rotated in high speed. U.S. Pat. No. 5,096,024 and 5,437,353 have disclosed this type of loading device.

SUMMARY OF THE INVENTION

It is the object of this invention to provide a magnetic adjustable loading device with eddy current wherein the movable stator is designed to move radially instead of moving axially, consequently, the variation of magnetic flux between the permanent magnet and metal conductor can be readily adjusted. A convenient and stepless adjusting to the loading amount is attained.

It is still the object of this invention to provide a magnetic adjustable loading device with eddy current wherein the overall size and the weight of the loading device are reduced which will become more flexible to meet the requirements on the indoor design.

BRIEF DESCRIPTION OF DRAWINGS

In order that the present invention may more readily be understood the following description is given, merely by way of example with reference to the accompanying drawings, in which.

DETAILED DESCRIPTION OF PREFERRED EMBODIMENT

Referring to FIGS. 1 to 8, the loading device made according to this invention generally comprises a flywheel (1) having a bearing (11) disposed therein.

Figure 3:
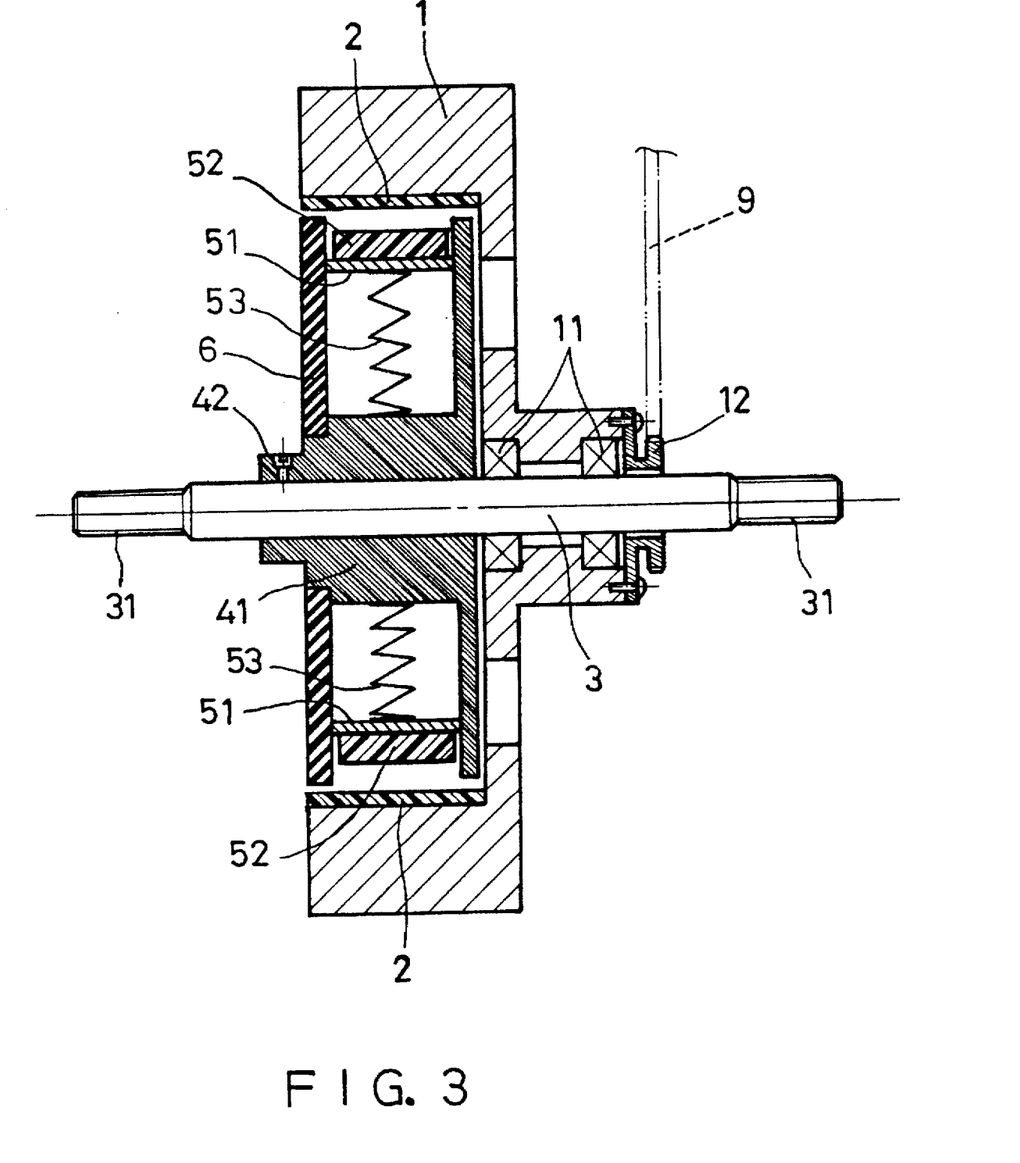
FIG. 3 is a cross sectional view taken from line 3—3 of FIG. 1.

A transmission element (12) is disposed at outer side, as clearly shown in FIG. 3.

A metal conductor (2) is disposed at the inner rim of the flywheel (1).

A shaft (3) is provided for mounting the bearing (11) of the flywheel (1) and the transmission element (12) thereof. Both end of the shaft (3) are provided with threaded portions (31).

A stator disk (4) is provided and disposed at inner side of the flywheel (1).

The stator disk (4) is locked to the shaft (3) by a flush-head bolt (42) disposed at central portion (41).

A stator (5) is installed to the stator disk (4).

A cover lid (6) is locked to the stator disk (7) to enclose the stator (5) therein.

An adjusting means (7) and a braking means (8) are also provided.

Characterized in that:

the stator (5) is configured by a pair of opposite circular magnetic plates (51) made from magnetic material. The outer rim portion is provided with a permanent magnet (52). The top portion of the circular plate (51) is pivotally mounted to the stator disk (4). The bottom end of the circular plate (51) is free to move. The inner rim portion of the circular plate (51) facing toward the central portion (41) of the stator disk (4) is disposed with a biasing spring (53).

The adjusting element (71) of the adjusting means (7) is provided with projected pin (711) at both ends. These projected pin (711) are movably received within the groove (43, 61) of the stator disk (4) and the cover lid (6) such that these projected pins (711) can move up and down within the groove (43, 61). The projected pin (43, 61) are further connected to the bottom portion of the stator (5) with a cable (72). The cable (72) is further guided by a pair of guiding posts (73) disposed at sides of the groove (43, 61).

The braking means (8) is connected to a controller (not shown) on the sporting equipment by a cable (81). The cable (81) is installed to the cover lid (6) by means of an eyelet (82). The cover lid (6) is provided with a transfer idle cam (83) which is connected to the adjusting element (71) of the adjusting means (7).

By the provision of those above described elements, the level of the adjusting element (71) can be readily adjusted by the braking means (8), consequently, the air gap between the stator (5) and the metal conductor (2) of the flywheel (1) is varied. Accordingly, the magnetic flux density is also changed. As a result, the resistance can be readily changed and adjusted in a stepless manner.

The magnetic plate (51) of the stator (5) can be pivotally mounted to the pin (44) of the stator disk (4). On the other hand, the stator disk (4) is provided with four symmetrically disposed positioning elements (45) for locking the cover lid (6) thereof with four screws (62). The positioning elements (45) may also serve to positioning inner rim of the magnetic plate (51) when the magnetic plate (51) is retracted.

The assembling and configuration as well as the designed and intended features are detailed described as below.

Figure 1:
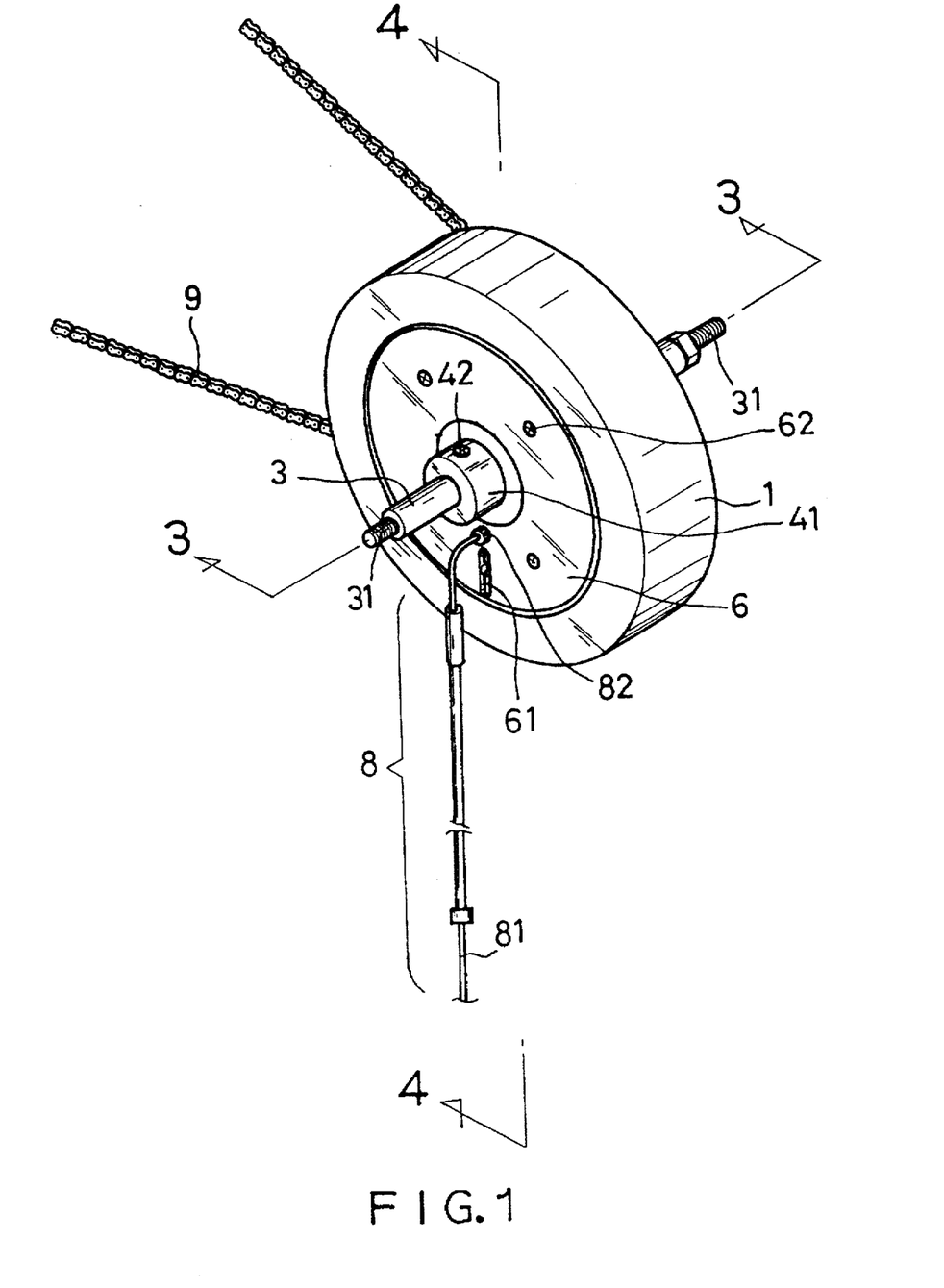
FIG. 1 is a perspective view of the loading device made according to this invention.
Figure 2:
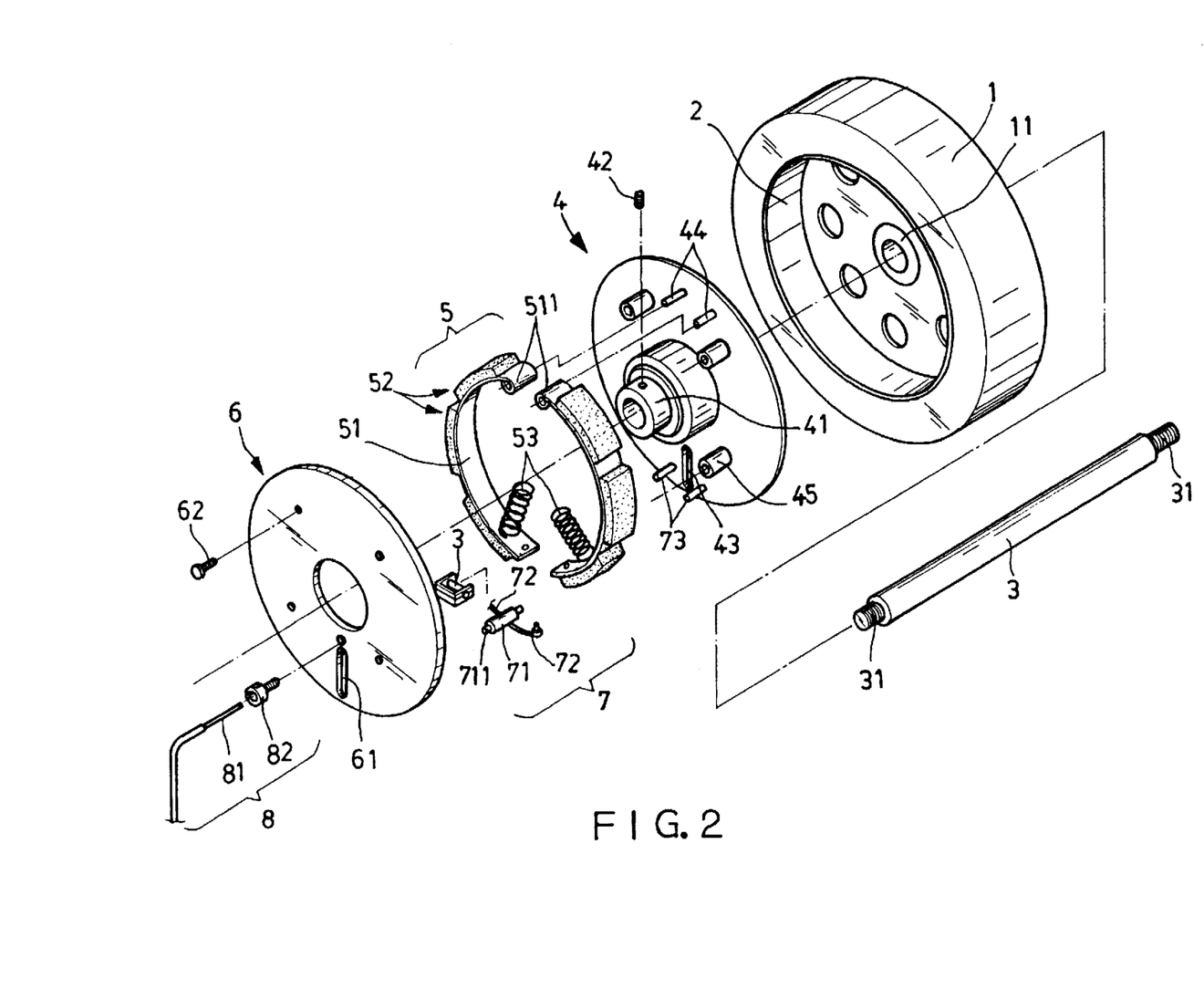
FIG. 2 is an exploded perspective view of the loading device made according to this invention.
Figure 4:
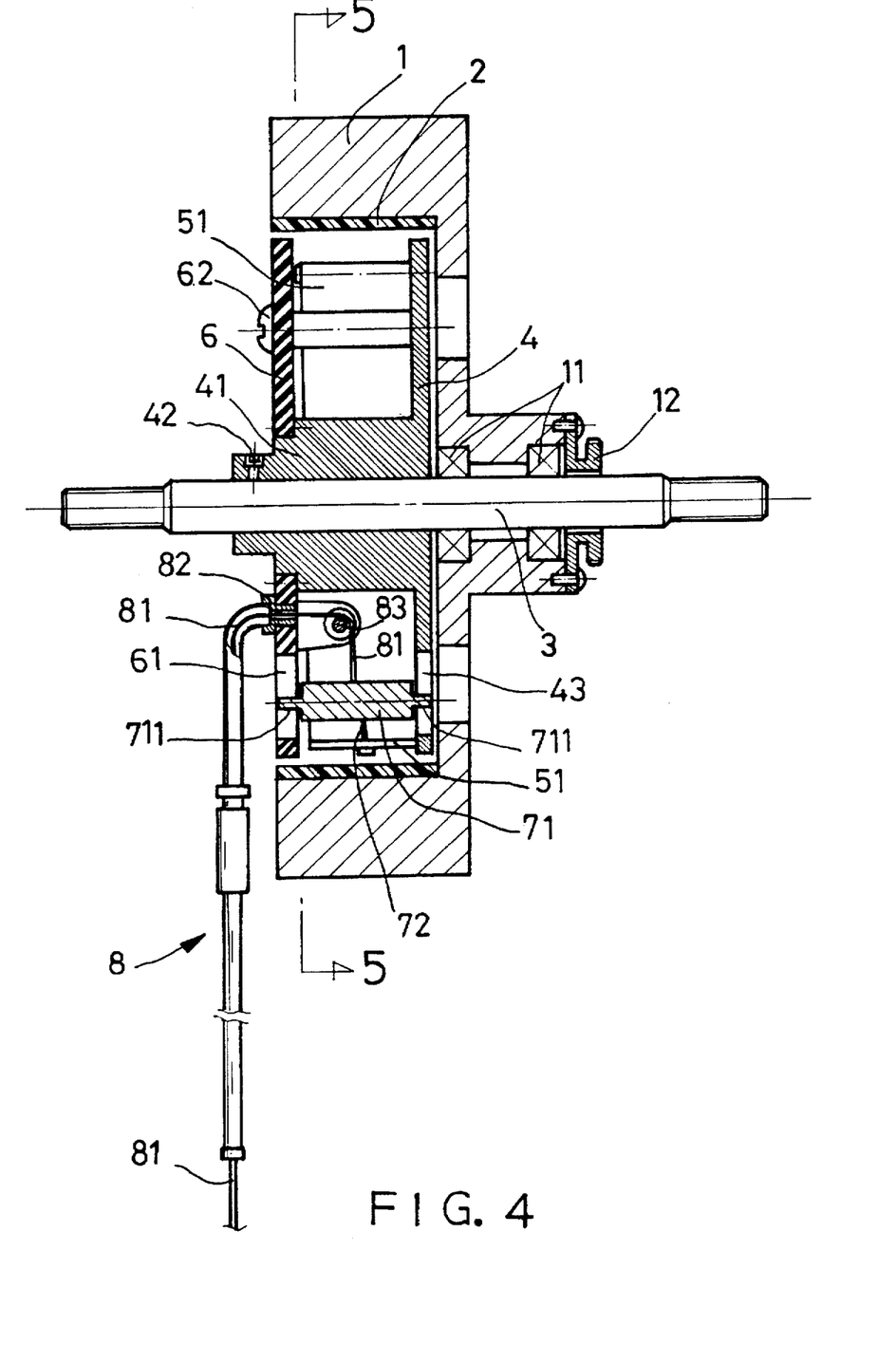
FIG. 4 is still a cross sectional view taken from line 4—4 of FIG. 1.

As shown in FIGS. 1 and 2, the bearing (11) of the flywheel (1) and the transmission element (12) are mounted onto the shaft (3) firstly. Then, as shown in FIGS. 3 and 4, the stator disk (4) is mounted onto shaft (3) and adjacent toward the inner side of the flywheel (1). By means of a flush-head screw (42) disposed at the central portion (41), the stator disk (4) is fixed to the shaft (3). The top portion of the stator (5) is pivotally mounted to the stator disk (4). The spring (53) is biased to the central portion (41) of the stator disk (4). Afterward, the cable (72) of the adjusting element (71) of the adjusting means (7) is applied to connect to the bottom of the stator disk (5). Then the cable (81) of the braking means (8) is installed onto the cover lid (6) via the eyelet (82). The cable (82) is connected to the adjusting element (71) via the transfer idle cam (83). The projecting pin (711) of the adjusting element (71) is movably mounted into the grooves (43, 61) of the stator disk (4) and the cover lid (6). Finally, the cover (6) is attached to the stator disk (4), as shown in FIG. 1.

As shown in FIGS. 3 and 4, a side elevational and cross sectional views are shown. After the loading device is assembled. The shaft (3) can be directly mounted to a supporting bracket (not shown) of a sporting equipment. The stator disk (4) locked to the shaft (3) and the stator (5) mounted onto the stator disk (4), cover lid (6), adjusting means (7) and braking means (8) are stationary. The flywheel (1) and the metal conductor (2) disposed at inner rim of the flywheel (1) are rotated on the shaft (3) by the transmitting element (9) via the transmission element (12). When the flywheel (1) and the metal conductor (2) is rotated between the magnetic flux provided by the permanent magnet (52) of the stator (5), an eddy current will be generated on the metal conductor (2). Since the associated magnetic field of the resulted eddy current is contradictory to the magnetic field of the permanent magnet (52) according to Lenz's Law. Consequently, a dragging force will be applied to the rotating flywheel (1). Accordingly, this dragging force can be used as the resistance of sporting equipment.

The transmitting element (9) can be a chain or belt and the transmission element (12) can be a gear or teeth pulley.

Figure 5:
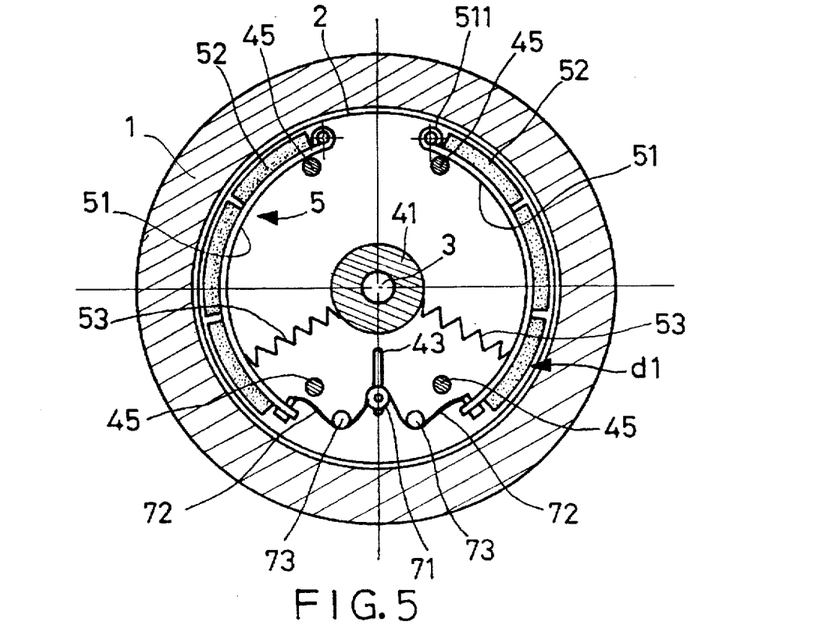
FIG. 5 is still a cross sectional view taken from line 5—5 of FIG. 3, showing the stator before adjusting.
Figure 6:
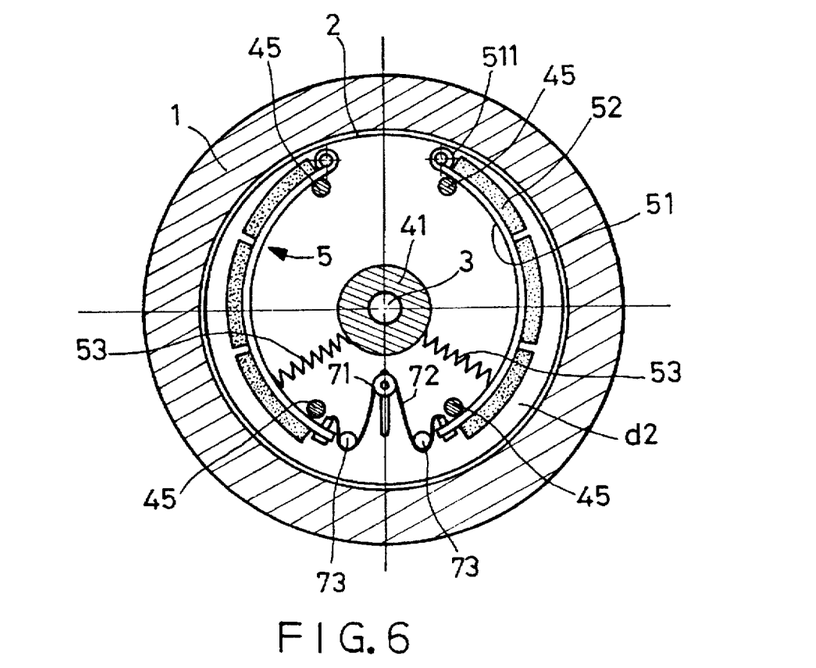
FIG. 6 is similar to FIG. 5 wherein the stator has been adjusted.

Referring to FIGS. 5 and 6, two schematic illustrations are shown for explaining the adjustment of the gap of the stator (5). When the controlling cable (82) of the braking means (8) is extended or retracted, the adjusting element (71) of the adjusting means (7) can be moved up and down along the grooves (43, 61) of the stator disk (4) and the cover lid (6). As the adjusting element (71) is moved up and down, the stator (5) is shrunk or expanded via the cable (72) through the guiding posts (73). Accordingly, the air gap (d2-d1) between the stator (5) and the metal conductor (2) is varied, i.e. the magnetic flux is varied as well and the resulted eddy current is also varied. In general, the larger the air gap (d2-d1) is, the smaller the magnetic flux density is. As a result, there is less eddy current generated on the metal conductor (2), i.e., smaller the resistance generated. To the contrary, the smaller the air gap (d2-d1) is, the larger the resistance will be generated.

As above mentioned, in the conventional coaxial eddy current loading device, a parallel resistance will be generated. Accordingly, a greater work is needed to move the stator toward or away from the flywheel, i.e. changing the magnetic flux density. However, the air gap between the stator (5) and the metal conductor (2) is adjusted radially. Only a fraction of force is required to overcome the potential force of the biasing spring (53) and the load or resistance can be readily changed. Besides, the stator (5) is adjusted radially, it may also reduced the dimension required. Consequently, the bulk size of the sporting equipment can also be advantageously reduced and the sporting equipment can be used in a more flexible way.

Figure 7:
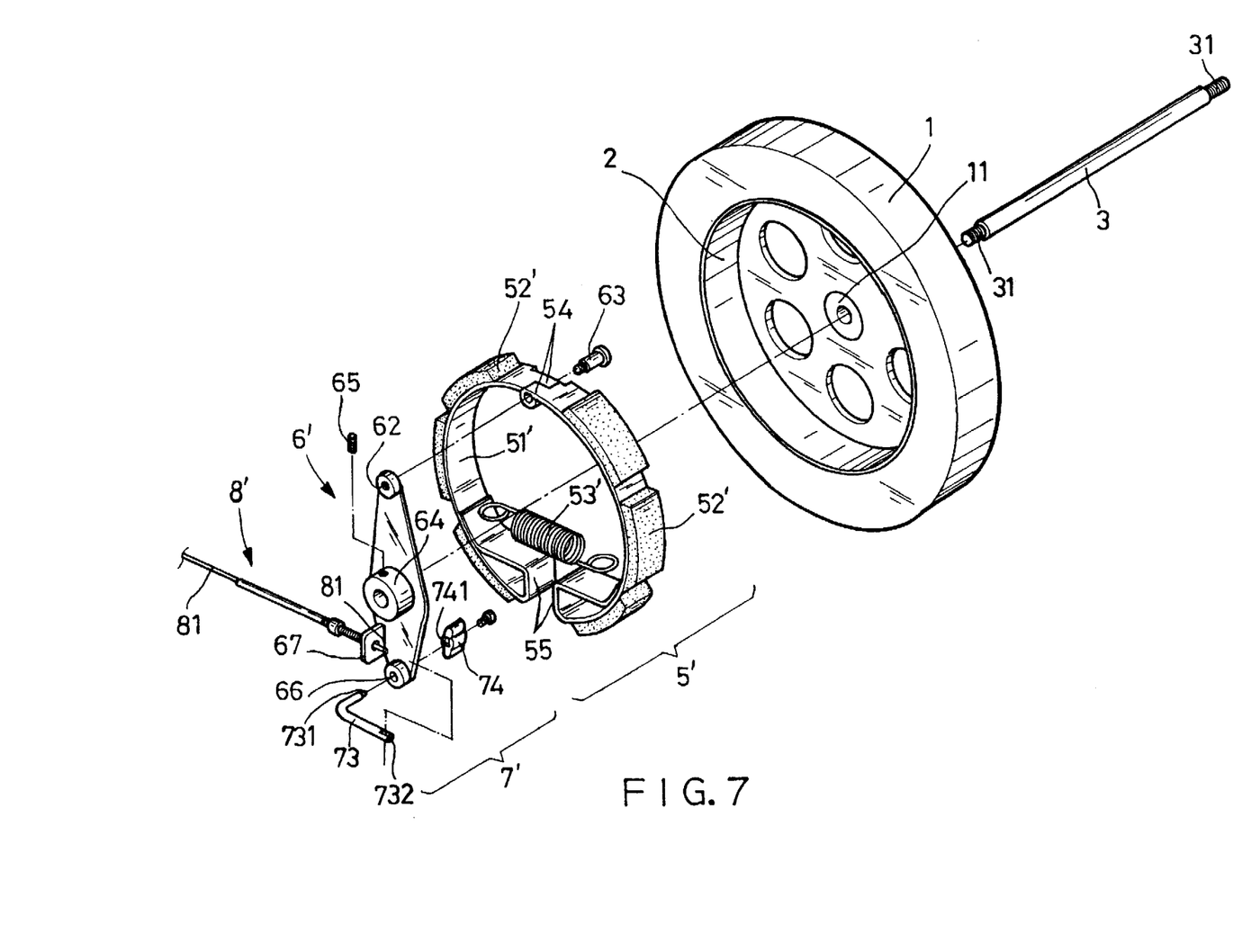
FIG. 7 is an perspective view of another feasible embodiment.
Figure 8:
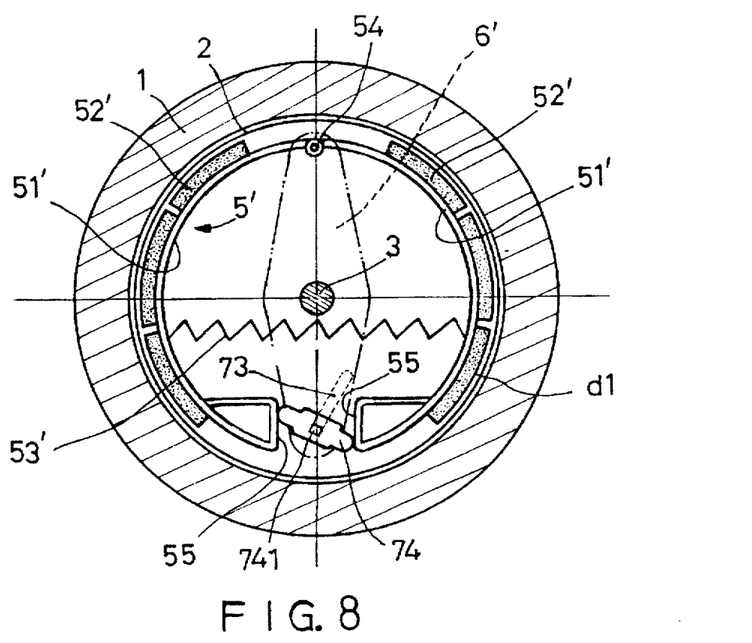
FIG. 8 is a schematic illustration showing the stator before adjusting.
Figure 9:
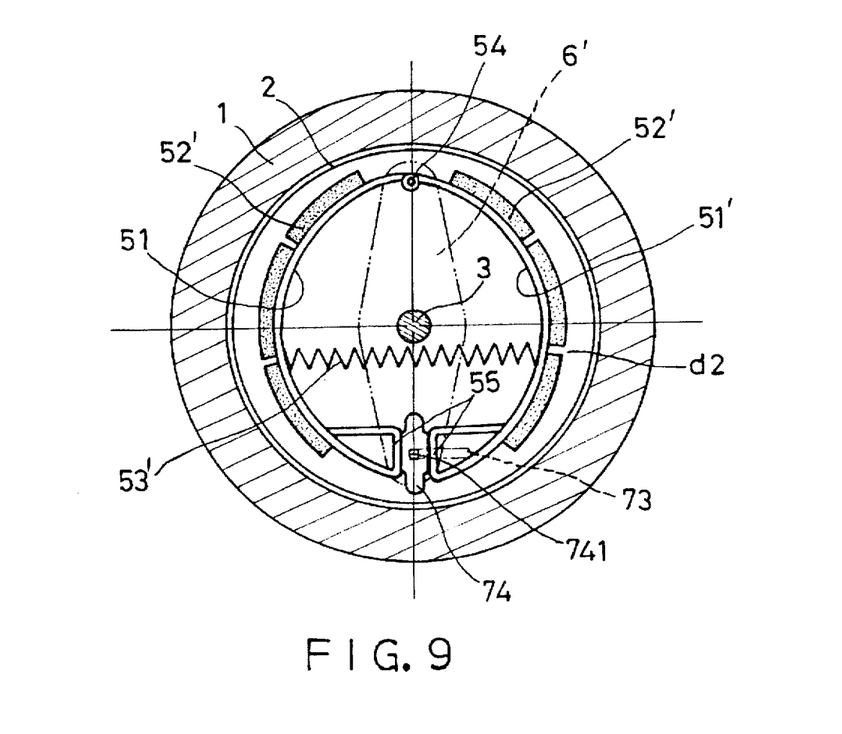
FIG. 9 is similar to FIG. 8 showing the stator after adjusting.

Referring to FIGS. 7 to 9, another feasible embodiment is shown. The loading device comprises a flywheel (1) having a bearing (11) disposed therein. A transmission element (12) is disposed at outer side, not shown in FIG. 7, but clearly shown in FIG. 3.

A metal conductor (2) is disposed at the inner rim of the flywheel (1).

A shaft (3) is provided for mounting the bearing (11) of the flywheel (1) and the transmission element (12) thereof. Both end of the shaft (3) are provided with threaded portions (31).

A stator (5') is pivotally mounted on a supporting bracket (6'). A adjusting means (7') and braking means (8') are disposed at the supporting bracket (6').

Characterized in that the stator (5') is comprised by a pair of circular magnetic plate (51') having provided with permanent magnet (52') at outer rim portion. In the suitable position at the inner rim portion, a pulling spring (53') is provided. The top portion of the circular magnetic plates (51') are assembled to form a loop (54) while the bottom end are set to free. The inner side of each of the circular magnetic plates is provided with two opposite surfaces (55).

The top of the supporting bracket (6') corresponding to the loop (54) of the stator (5') is provided with a threaded hole (62). Accordingly, a locking bolt (63) can be applied for locking pivotally the stator (5') on the supporting bracket (6'). In turn the supporting bracket (6') is attached to the shaft (3) by a flush-head screw (65). The bottom of the supporting bracket (6') is provided with an eyelet (66) and a stopper (67).

The adjusting means (7') includes a L-shape adjusting rod (73) disposed within the eyelet (66) of the supporting bracket (6'). The end portion of the adjusting rod (73) which passes therethrough the eyelet (66) has a rectangular cross section (731). The rectangular end portion (731) can be received and retained within a corresponding rectangular hole (741) of an adjusting plate (74). The adjusting plate (74) is disposed between those two opposite surfaces (55) of the stator (5').

The braking means (8') comprises a controller (not shown) which includes a cable (81'). The end of the cable (81') passes through the stopper (67) of the supporting bracket (6') and in turn connect to the adjusting rod (73) of the adjusting means (7').

When those above described components are assembled and the adjusting rod (73) is actuated to shift an angle by the braking means (8'), the adjusting plate (74) is also shifted to an equal angle. Accordingly, the distance between two opposite surfaces (55) of the stator (5') is varied. In turn, the air gap (d2-d1) between the flywheel (1) and the metal conductor (2) is varied. As a result, the magnetic flux density is changed accordingly. Then the loads or resistance of the loading means can be adjusted stepless.

This second embodiment applies the same technique as the first embodiment. There is only a little difference. As shown in FIG. 7, the stator (5') is comprised by a pair of circular magnetic plates (51') which are pivotally connected to form a loop (54). The stator (5') is further attached to the threaded hole (62) of the supporting bracket (6') by a blot (63). Then the supporting bracket (6') is attached fixedly to the shaft (3) by a flush-head screw (65) through the central portion (64) such that the stator (5') is positioned in the inner rim portion of the flywheel (1). Then the adjusting rod (73) of the adjusting means (7) is installed within the eyelet (66) of the supporting bracket (6') such that the rectangular end portion (731) of the adjusting rod (73) is received and retained within the rectangular hole (741) of the adjusting plate (74) such that the adjusting plate (74) is positioned between those two opposite surfaces (55) at the bottom of the stator (5'). Then this adjusting plate (74) is connected to the cable (81') which passes through the stopper (64) of the supporting bracket (6'). As a result, when the cable (81') is manipulated, the adjusting rod (73) is also moved and shifted. The stopper (67) provides a limit for the ultimate position of the adjusting rod (73).

Referring to FIGS. 8 and 9, two schematic illustrations for the adjustment of the adjusting means (7') are shown. When the adjusting rod (73) is moved and shifted an angle by the manipulation of the braking means (8'), the adjusting plate (74) is moved and shifted to the same angle. Consequently, the stator (5') is expanded outwardly and in turn the air gap (d2-d1) between the stator (5') and the metal conductor (2) is varied. As the air gap is varied, the magnetic flux density is also changed and the loading or resistance resulted by inducing eddy current is also changed. When the adjusting rod (73) is released, with the pulling force from the spring (53'), those two circular magnetic plates (51') are shrunk as centered on the loop (54). When the adjusting plates (74) are positioned at vertical position, a largest air gap (d2) is established between the stator (5') and the metal conductor (2).

By the provision of the present invention, the present invention can be concluded with the following advantages.

1) The stator of the present invention applies radial displacement instead of axial displacement, consequently, the parallel dragging force resulted from rotating flywheel is eliminated. By the way, the maximum radial displacement of the stator ranges from 6 mm to 8 mm, it can be readily and conveniently manipulated.

2) Since the adjustment of the loading or resistance is performed through the radial displacement of the stator which is occurred within the flywheel, accordingly, no additional space is required for the displacement of the stator as required in the axial displacement. In light of this, the configuration of the present invention is more compact and neat as compared with the loading devices disclosed by Taiwan Utility Patent Application No. 79-2-06996 and U.S. Pat. No. 5,437,353. The sporting equipment incorporated with the loading device made according to this invention is more flexible and subtle.

3) The braking means is connected to a controller of the sporting equipment by means of a cable. Then an adjuster is applied for adjusting the cable to manipulate the adjusting means which in turn vary the radial position of the stator. With a precise and accurate design, a relative small force is required for performing the manipulation. If the cable is to be replaced by a motor, only a small torque rating of motor is required and the load or resistance can be readily done by the motor. This is all resulted from the radial displacement of the stator.

While particular embodiment of the present invention has been illustrated and described, it would be obvious to those skilled in the art that various other changes and modifications can be made without departing from the spirit and scope of the invention. It is therefore intended to cover in the appended claim all such changes and modifications that are within the scope of the present invention.

I claim:

1. A magnetic adjustable loading device with eddy current comprising:

a flywheel having a bearing disposed therein, a transmission element being disposed at outer side;

a metal conductor being disposed at an inner rim of said flywheel;

a shaft being provided for mounting said bearing of said flywheel and said transmission element thereof, both end of said shaft being provided with threaded portions;

a stator disk being provided and disposed at inner side of said flywheel, said stator disk being locked to said shaft by a flush-head bolt disposed at central portion;

a stator being installed to said stator disk;

a cover lid being locked to said stator disk to enclose said stator therein, an adjusting means and a braking means being also provided;

characterized in that said stator is configured by a pair of opposite circular magnetic plates made from magnetic material, an outer rim portion being provided with a permanent magnet, a top portion of said circular plate being pivotally mounted to said stator disk, a bottom end of said circular plate being free to move, the inner rim portion of said circular plate facing toward the central portion of said stator disk being disposed with a biasing spring;

said adjusting means comprising an adjusting element which is provided with projected pin at both ends, said projected pin being movably received within the grooves of said stator disk and said cover lid such that said projected pins can move up and down within said grooves, said projected pin being further connected to the bottom portion of said stator with a cable, said cable being further guided by a pair of guiding posts disposed at sides of said grooves;

said braking means being connected to a controller on a sporting equipment by a cable, said cable being installed to said cover lid by means of an eyelet, said cover lid being provided with a transfer idle cam which is connected to said adjusting element of said adjusting means;

by the provision of those above described elements, the level of said adjusting element can be readily adjusted by said braking means, consequently, an air gap between said stator and said metal conductor of said flywheel is varied and the magnetic flux density is also changed, as a result, the resistance can be readily changed and adjusted in a stepless manner.

2. A magnetic adjustable loading device with eddy current as recited in claim 1, wherein the top of said circular magnetic plate is folded to form a pivotal hole for mounting on a pin of said stator disk, said stator disk further including four positioning elements for mounting said cover lid thereon, consequently, the inner rim of said circular magnetic plate can be readily positioned.

3. A magnetic adjustable loading device with eddy current as recited in claim 1, wherein a transmitting element can be a chain or belt and the transmission element can be a gear or teeth pulley.

4. A magnetic adjustable loading device with eddy current, comprising a flywheel having a bearing disposed therein, a transmission element being disposed at outer side;

a metal conductor being disposed at the inner rim of said flywheel;

a shaft being provided for mounting said bearing of said flywheel and said transmission element thereof, both end of said shaft being provided with threaded portions;

a stator being pivotally mounted on a supporting bracket, an adjusting means and a braking means being disposed at said supporting bracket;

characterized in that said stator is comprised by a pair of circular magnetic plate having provided with permanent magnet at an outer rim portion, in the suitable position at an inner rim portion, a pulling spring being provided, top portions of said circular magnetic plates being assembled to form a loop while bottom ends are set to free, the inner side of each of said circular magnetic plates being provided with two opposite surfaces;

a top of said supporting bracket corresponding to said loop of said stator being provided with a threaded hole, a locking bolt being applied for locking pivotally said stator on said supporting bracket, in turn said supporting bracket being attached to said shaft by a flush-head screw, a bottom of said supporting bracket being provided with an eyelet and a stopper;

said adjusting means including an L-shaped, adjusting rod disposed within said eyelet of said supporting bracket, an end portion of said adjusting rod which passes therethrough said eyelet being provided with a rectangular cross section which can be received and retained within a corresponding rectangular hole of an adjusting plate which is disposed between said two opposite surfaces of said stator;

said braking means including a controller which includes a cable thereof, an end of said cable being directed to pass through said stopper of said supporting bracket and in turn connect to said adjusting rod of said adjusting means;

when said adjusting rod is moved and shifted an angle by manipulation of said braking means, said adjusting plate is moved and shifted to the same angle, consequently, said stator is expanded outwardly and in turn an air gap between said stator and said metal conductor is varied, as the air gap is varied, the magnetic flux density is also changed and the loading or resistance resulted by inducing eddy current is also changed, the loading device can be adjusted in a stepless manner.

* * * * *